(12) United States Patent
Meier et al.

(10) Patent No.: US 9,282,079 B2
(45) Date of Patent: Mar. 8, 2016

(54) MICROKERNEL GATEWAY SERVER

(75) Inventors: Guillaume Meier, Paris (FR); Marc Chaland, Levis St Nom (FR); Nicolas Clermont, Villejuif (FR); Francis Hauguet, Montigny le Bretonneux (FR)

(73) Assignee: EADS SECURE NETWORKS, Elancourt (FR)

( * ) Notice: Subject to any disclaimer, the term of this patent is extended or adjusted under 35 U.S.C. 154(b) by 880 days.

(21) Appl. No.: 13/141,816

(22) PCT Filed: Dec. 23, 2009

(86) PCT No.: PCT/FR2009/052687
§ 371 (c)(1),
(2), (4) Date: Aug. 17, 2011

(87) PCT Pub. No.: WO2010/076523
PCT Pub. Date: Jul. 8, 2010

(65) Prior Publication Data
US 2011/0296026 A1 Dec. 1, 2011

(30) Foreign Application Priority Data

Dec. 30, 2008 (FR) ...................................... 08 59143

(51) Int. Cl.
*G06F 15/167* (2006.01)
*H04L 29/06* (2006.01)
(Continued)

(52) U.S. Cl.
CPC ................ *H04L 63/02* (2013.01); *G06F 9/544* (2013.01); *G06F 21/53* (2013.01); *H04L 63/168* (2013.01);
(Continued)

(58) Field of Classification Search
CPC ..... H04L 63/02; H04L 69/32; H04L 12/4625; H04L 63/168; G06F 21/53; G06F 9/544; G06F 11/2043
USPC ........................ 709/221–230, 213; 705/25–30
See application file for complete search history.

(56) References Cited

U.S. PATENT DOCUMENTS 5,771,383 A * 6/1998 Magee .................... G06F 9/544
718/100
5,828,893 A 10/1998 Wied et al.
(Continued)

FOREIGN PATENT DOCUMENTS

EP 0689139 A2 * 6/1995 ................ G06F 9/46

OTHER PUBLICATIONS

X Zhang, et al.; XenSocket: A high-throughput interdomain transport for virtual machines; 2007; Middleware 2007, Springer; 20 pages.*
(Continued)

*Primary Examiner* — Oleg Survillo
(74) *Attorney, Agent, or Firm* — Pillsbury Winthrop Shaw Pittman LLP

(57) ABSTRACT

A gateway server includes a first subsystem including a media level, a communication level and a control level; a microkernel; an IPC controller configured to manage communication between the server resources allocated to the first subsystem a second subsystem including a second media level, a second communication level and a second control level such that the microkernel and the IPC controller also manage communication between the server resources allocated to the second subsystem; and a memory with shared reading and writing, established under the control of the microkernel and the IPC controller, between the control level of the first subsystem and the control level of the second subsystem.

14 Claims, 2 Drawing Sheets

(51) Int. Cl.
  *G06F 21/53* (2013.01)
  *G06F 9/54* (2006.01)
  *H04L 29/08* (2006.01)
  *H04L 12/46* (2006.01)
  *G06F 11/20* (2006.01)

(52) U.S. Cl.
  CPC ............ *H04L 69/12* (2013.01); *H04L 69/32* (2013.01); *G06F 11/2043* (2013.01); *H04L 12/4625* (2013.01)

(56) References Cited

U.S. PATENT DOCUMENTS

| | | | |
|---|---|---|---|
| 6,359,909 B1* | 3/2002 | Ito | H04L 49/20 370/217 |
| 6,510,464 B1* | 1/2003 | Grantges et al. | 709/225 |
| 6,836,888 B1* | 12/2004 | Basu et al. | 718/104 |
| 8,627,069 B2* | 1/2014 | Clermont et al. | 713/164 |
| 2001/0054055 A1* | 12/2001 | Bollella | 709/102 |
| 2002/0016863 A1* | 2/2002 | Lurndal | 709/310 |
| 2002/0062401 A1* | 5/2002 | Auslander et al. | 709/312 |
| 2004/0202328 A1* | 10/2004 | Hara | H04H 20/74 380/270 |
| 2004/0205208 A1 | 10/2004 | Koponen et al. | |
| 2005/0149726 A1* | 7/2005 | Joshi et al. | 713/164 |
| 2006/0069692 A1* | 3/2006 | Pernia | 707/100 |
| 2006/0206904 A1* | 9/2006 | Watkins et al. | 719/321 |
| 2007/0094676 A1* | 4/2007 | Fresko et al. | 719/330 |
| 2007/0110436 A1 | 5/2007 | Bennett | |
| 2008/0016313 A1* | 1/2008 | Murotake et al. | 711/173 |
| 2008/0104600 A1* | 5/2008 | May | 718/103 |
| 2008/0148277 A1* | 6/2008 | di Flora | 719/313 |
| 2008/0282253 A1* | 11/2008 | Huizenga | 718/104 |
| 2009/0158299 A1* | 6/2009 | Carter | 719/319 |
| 2009/0276654 A1* | 11/2009 | Butterworth et al. | 714/1 |
| 2010/0138639 A1* | 6/2010 | Shah et al. | 712/227 |
| 2014/0304359 A1* | 10/2014 | Corbett | G06F 3/0614 709/213 |

OTHER PUBLICATIONS

International Search Report as issued for PCT/FR2009/052687.
Elphinstone, Kevin; "Future Directions in the Evolution of the L4 Microkernel"; Proceedings of the NICTA Workshop on OS Verification 2004; 2004; pp. 1-17.

* cited by examiner

MICROKERNEL GATEWAY SERVER

CROSS REFERENCE TO RELATED APPLICATIONS

This application is the U.S. National Stage of PCT/FR2009/052687, filed Dec. 23, 2009, which in turn claims priority to French Patent Application No. 0859143, filed Dec. 30, 2008, the entire contents of all applications are incorporated herein by reference in their entireties.

FIELD

The present invention relates to a gateway server provided with a microkernel. It also relates to a method for transmitting data between networks via a gateway server.

BACKGROUND

Conventional operating systems, such as Microsoft Windows or GNU/Linux, have not been designed to have strong security constraints. The result is a poorly secure design in the form of an operating system which uses operative layers which can be represented in accordance with different models, such as the OSI (open systems interconnection) model.

Within the scope of a gateway server 17 (FIG. 1), also known as a 'proxy', this representation can be carried out simply in three levels:
- a first, control level 16 comprises a kernel which manages the operations carried out by the applications of the operating system, in particular by allocating resources to these applications and by controlling the communication between these resources. The kernel is typically a monolithic kernel, although a modular approach can be selected to manage, in particular, each resource offered by the operating system.
  A monolithic kernel of this type includes low-level software, such as the scheduler, process manager, memory manager and device drivers, as well as some high-level services such as file systems, cryptographic algorithm systems or filtering systems.
- a second, communication level 14 comprises the software applications, in particular forming the protocol stacks required to send or receive data via a telecommunications network using a communications protocol.
  In a protocol stack each layer solves a specific number of problems regarding data transmission and provides well-defined services to the upper layers of the first level 16. These top layers are closer to the user and manage more abstract data by using the services of the lower layers which edit these data so they can be sent over a physical medium.
- a third, media level 12 forming the interface between the server 17 and an external network 10 or 11. This level 12 typically conforms to the Ethernet protocol implementing a physical layer and a software sub-layer, i.e. the media access control (MAC) layer of the OSI model.

A gateway server 17 of this type can have a filtering function intended to ensure the transmission of data 13 received, for example, from an unsecured network 10 such as the Internet network to a sensitive network 11. In this case, these data 13 are processed:
- by the Ethernet level 12 of the gateway server 17 so as to enable processing of said data in the server, then
- by the communication level 14 comprising a TCP/IP (transmission control protocol and Internet protocol) protocol stack so as to generate data transmitted in accordance with transport protocols conforming to application protocols, then lastly
- by the control level 16 implementing high-level filtering services making it possible, for example, to decrypt the data before they are sent to the sensitive network 11.

The present invention is based on the fact that such a server, and the method required for its implementation, have drawbacks. In particular, they have weaknesses in terms of the complexity of a monolithic kernel and the architecture of a computer system which does not allow formal verification of the vulnerability of a gateway server.

More specifically, no mechanism makes it possible to prove that the data from 10 subsequently pass through all the filtering steps performed by the levels 12, 14 and 16. A voluntary or accidental dysfunction 15 may thus occur over one of these levels 12 or 14 and may lead to a bypassing of the control level 16.

By way of example, such a dysfunction 15 is demonstrated at the communication level 14, for example within the layer specific to the TCP/IP stack. In this case, this dysfunction 15 transmits data coming from the network 10 to the network 11 without the prior transmission of said data to the control level 16.

It is thus possible to access the network 11 independently of the rules of transmission which must be applied by the control level 16, which constitutes an unacceptable flaw of the server 17.

SUMMARY

In order to solve this problem, the present invention relates to a gateway server provided with a first subsystem including a media level, a communication level and a control level, said server also including a microkernel and an IPC controller managing communication between the server resources allocated to the first subsystem, characterised in that said server includes:
- a second subsystem, including a second media level, a second communication level and a second control level, such that the microkernel and the IPC controller also manage communication between the server resources allocated to said second subsystem; and
- a memory with shared reading and writing, established under the control of the microkernel and the IPC controller, between the control level of the first subsystem and the control level of the second subsystem.

A gateway server of this type solves the problem of the absence of transmission control functions caused by provoked or accidental dysfunctions at the media level and/or communication level of a gateway server.

In fact, such a dysfunction cannot result in the transmission of data between networks in a server according to the invention since only the control level can transmit data between these networks via the shared memory.

Such a server therefore affords numerous advantages. On the one hand it makes it possible to respond to a lack of clearly established security rules in the sensitive network since these rules can be implemented by its control level.

It also makes it possible to prevent an attack emanating from a non-sensitive network with the aim of bypassing the security level of a gateway server by bypassing the control level thereof.

A server according to the invention thus makes it possible to protect a network which is sensitive to voluntary or involuntary external attacks. In this manner, it makes it possible to ensure a security policy between networks of different sensitivity, for example between an unsecured network and a sensitive network.

In one embodiment each subsystem comprises means for encoding information, which has been received in a request which conforms to a network communications protocol, into a binary structure which conforms to a communications protocol for communication between the control level of the first subsystem and the control level of the second subsystem.

In this case each sub-system may comprise means for encoding the information into a binary structure after processing of said information in the communication level and then in the control level of said subsystem.

In accordance with one embodiment the server comprises means for identifying, as a function of the nature of the request, data which are characteristic of the request and have to be encoded in the binary structure.

In one embodiment the server comprises means for associating the request received with a request which has been predefined in a limited list of authorised requests.

In accordance with one embodiment the microkernel comprises means for associating each application implemented by a subsystem with the control of a server resource.

In one embodiment the server comprises means for limiting communication in such a way that neither the media level nor the communication level of a subsystem can communicate directly with the media level or the communication level of the other subsystem without the intermediary of the control levels of the subsystems.

In accordance with one embodiment the server comprises means for analysing the syntax and validity of the protocols filtered by each layer used in the server.

The invention also relates to a method for controlling a gateway server provided with a first subsystem including a media level, a communication level and a control level, said server also including a microkernel and an IPC controller managing communication between the server resources allocated to the first subsystem, characterised in that, since the server is also provided with a second subsystem including a second media level, a second communication level and a second control level such that the microkernel and the IPC controller also manage communication between the server resources allocated to said second subsystem, a memory with shared reading and writing, established under the control of the microkernel, is used to send requests between the control level of the first subsystem and the control level of the second subsystem with the aid of a server according to any one of the above embodiments.

Lastly, the invention also relates to a computer program product including program code instructions recorded on a support which can be read by a computer to implement a method according to the invention when said program runs on a computer.

BRIEF DESCRIPTION OF THE DRAWINGS

The invention will be better understood upon reading the following description which is given solely by way of non-limiting example and with reference to the accompanying drawings, in which.

DETAILED DESCRIPTION

Figure 1:
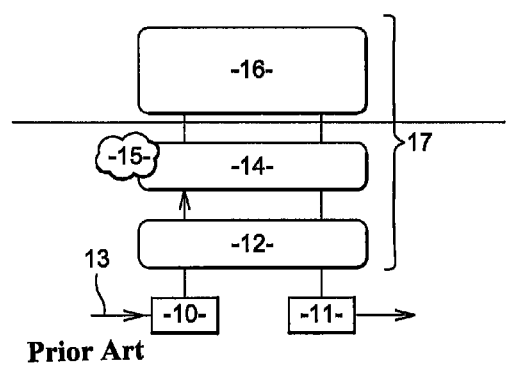
FIG. 1, which has already been described, is a schematic view of the operation of a gateway server according to the prior art.
Figure 2:
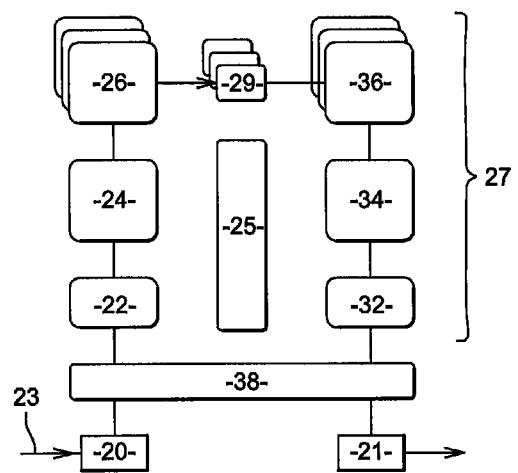
FIG. 2 is a schematic view of the operation of a gateway server according to the invention.

With reference to FIG. 2, a gateway server 27 according to the invention comprises two media levels 22 and 32, two communication levels 24 and 34, and two control levels 26 and 36.

However, a single microkernel 38 is used to carry out some basic functions, including the management of communication between the server resources, in particular by IPC (inter process communication) message transfer.

In addition to this management, a second generation microkernel includes a clock driver and a scheduler such that a microkernel of this type includes less than 20,000 code lines.

By contrast, a monolithic microkernel includes millions of code lines with a proportional risk of bugs and security flaws. It can hardly be verified as conforming to the specifications of code verifiers and current formal proof systems.

Moreover, monolithic kernels have poor isolation properties. In fact, user processes can break the different types of isolation thanks to pipelines, files, the shared memory, etc. The management of interprocess communication is not trusted.

In fact, as previously mentioned, within a monolithic kernel there is no isolation between kernel subsystems such as between the drivers and network stacks. A driver of a bugged or corrupted hardware component may therefore put the entire system at risk.

The use of 'second generation' microkernels solves the problem linked to a flaw within the control level. These microkernels are of such a size that they can be serviced easily and evaluated formally so as, for example, to certify them at a higher level such as level 7 of the EAL (evaluation assurance level) international standard.

For example, the most commonly known second generation microkernels, which are currently used in different variations, are supported on an L4 API (application programming interface), which was designed by Jochen Liedtke.

A gateway server provided with such a microkernel thus makes it possible to respond to the complexity and vulnerability of monolithic kernels. In terms of security such a system benefits from the security of the microkernel.

However, the security of servers also depends on the security of the IPC communication since this represents a possible means of transmitting dangerous data. For reasons of efficacy the management of the security of communications is traditionally left to the servers, the microkernel being satisfied with transmitting the messages.

This is why, in this embodiment, the microkernel 38 includes an IPC controller 25 offering a mechanism of communication rights such that two applications can only communicate with one another if the controller 25 recognises that these applications have the appropriate rights.

In fact, the microkernel considers each application, for example of services or drivers, as the subject of security criteria which are provided to it beforehand.

From these criteria the microkernel 38 can allocate system resources to the applications that it manages in accordance with a rule established upon its start-up, whilst its IPC controller 25 allocates or refuses rights for communication between these applications.

In other words the microkernel 38 identifies the resources to be allocated, such as the memory, inputs and outputs and privileges for the management levels, as well as any communication waiting for the authorisation of the IPC controller 25.

When an application requires IPC communication between different elements, the IPC controller 25 thus determines from this list whether the requesting application has a right to communicate with the recipient application.

The IPC controller 25 thus performs the function of an IPC controller for, for example, issuing communication rights to specific applications on request. Said IPC controller can likewise detect attempts to violate security criteria and supply an audit on the violation potential.

In this embodiment the microkernel 38 also maintains previously authorised communications for each application.

Such a structure makes it possible to accurately control the use of the resources whilst each application is simultaneously connected to the control of a resource, that is to say of a hardware component or mechanism, which reinforces the control to block the spread of an attack or bug.

In the server 27, the data processing thus uses two subsystems, more specifically:
- on the one hand a subsystem formed by the media level 22, the communication level 24 and the control level 26, which subsystem is connected to the unsecured network 20, for example the Internet network, and
- on the other hand a secured subsystem formed by the media level 32, the communication level 34 and the control level 36, which subsystem is connected to the sensitive network 21, for example an avionics network, a defence intranet and/or a central communication node.

In fact, each subsystem manages a flow of data, for example at its network interface or its protocol stack, by using its own physical resources which are isolated from the other subsystem apart from between their control levels, as will be described below.

The microkernel 38 and its IPC controller 25 thus only authorise communications between the respective media level 22 or 32 and the respective communication level 24 or 34, said communication level only being able to communicate with the respective control level 26 or 36.

Supposing that an attack or bug originating from the network 20 were to succeed in infiltrating through a flaw in one of the layers of the media level 22 and/or communication level 24, for example in the application of a driver and/or of the protocol stack, data cannot therefore be transmitted to the sensitive network 21 without being processed by the control levels 26 and 36.

Furthermore, the architecture of the server makes it possible to carry out a deep filtering process of the network, this filtering process using an analysis of the syntax and of the validity of the protocols filtered by each layer of the server, for example: Ethernet, IP, TOP, application level.

For this reason, a request received by the unsecured subsystem is transformed, during the progressive processing thereof by the communication level 24 and then by the control level 26, from a request into a simple, clearly defined binary structure.

Figure 3:
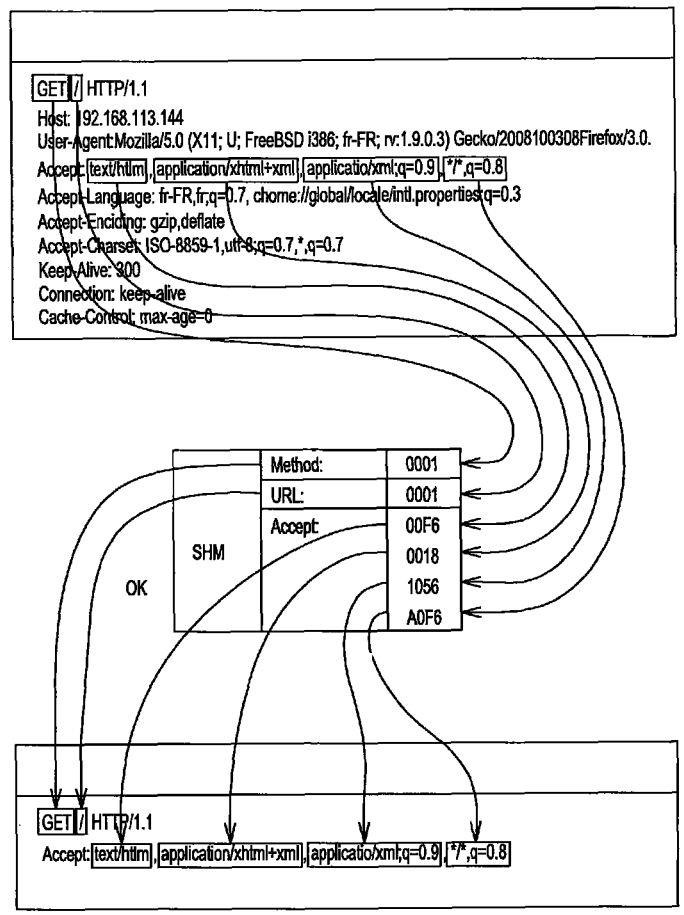
FIG. 3 shows the processing of a HTTP request by a server according to the invention.

Such a transformation is shown in FIG. 3, which illustrates the decomposition of an HTTP protocol request into binary data encoding the information transmitted by said HTTP instruction.

More specifically, these data include a "get" instruction, a URL address, the version of the HTTP protocol used and the file formats taken into account by a browsing or navigation software.

These binary data, shown in a table for reasons of clarity, are then sent to the control level 36 of the secured subsystem via the intermediary of a memory 29 which is shared between the two subsystems.

To this end, an exhaustively defined protocol is used. Such a protocol defines all requests which can be emitted by the control level 26 of the unsecured network, in such a way that the data fields required for these requests can, on the one hand, be predetermined and, on the other, be filled in by binary data encoding the information identified in the received request.

The requests sent by the unsecured network 20 via the gateway server 27 are thus processed by the unsecured subsystem in order to extract therefrom any data which are characteristic of said requests, these characteristic data being sent to the secured subsystem via the control level 26 of said unsecured subsystem.

The secured subsystem then rewrites the request in accordance with its communication level 34, for example in accordance with an HTTP protocol, on the basis of previously extracted characteristic data. This request is then sent via the communication level 32 to the recipient server which can then be validly and securely forced.

Such a processing of data is shown in FIG. 3 from binary data previously obtained from an HTTP request.

In return, the response of the recipient server is received by the media level 32, then by the communication level 34 so as to reach the control level 36.

Said control level 36 can then transmit the binary data obtained from the response through the shared memory 29 such that said memory transmits it to the requester via the levels 26, 24 and then 22 of the unsecured subsystem.

It would appear that a gateway server according to the invention does not aim to block bugs and/or attacks, but to limit their effect on the sensitive network since all requests emitted within the sensitive network by said server are requests validated by their rewriting, said validated requests not corresponding exactly to the initial request. The security of the gateway is thus ensured by the architecture of the server.

To summarise, each subsystem acts as a trap which can only communicate with the other subsystem via the intermediary of a memory in which binary data are recorded which encode the information identified in a request received at the input of one of the subsystems in predefined fields.

In this way, the subsystems only communicate via the intermediary of their control level, which is particularly trusted owing to the presence of a microkernel, and by means of data of which the scope is limited to the predefined field.

The present invention may encompass numerous variations. In particular, the description given above of the invention provides a microkernel 38 including the IPC controller 25 although, depending on the variations and criteria used to define a microkernel, said IPC controller 25 may be located outside the microkernel 38.

The invention claimed is:

1. A method for controlling a gateway server comprising a first subsystem including a media level, a communication level and a control level, a microkernel, an IPC controller configured to manage communication between the server resources allocated to the first subsystem, a second subsystem including a second media level, a second communication level and a second control level such that the microkernel and the IPC controller also manage communication between the server resources allocated to said second subsystem, the method comprising transmitting requests between the control level of the first subsystem and the control level of the second subsystem, the requests transmitted using a memory with shared reading and writing, established under the control of the microkernel and the IPC controller, wherein data to be received by said first subsystem are transferred to said second subsystem only via the control level of said first subsystem.

2. A gateway server comprising:
a first subsystem including a media level, a communication level and a control level;
a microkernel;
an IPC controller configured to manage communication between the server resources allocated to the first subsystem;
a second subsystem including a second media level, a second communication level and a second control level such that the microkernel and the IPC controller also manage communication between the server resources allocated to said second subsystem; and
a memory with shared reading and writing, established under the control of the microkernel and the IPC controller, between the control level of the first subsystem and the control level of the second subsystem,
wherein data to be received by said first subsystem are transferred to said second subsystem only via the control level of said first subsystem.

3. The server according to claim 2, wherein each subsystem includes a non-transitory computer readable memory encoded with code instructions for encoding the information, received in a request in accordance with a network communications protocol, into a binary structure in accordance with a communications protocol for communication between the control levels of the first subsystem and of the second subsystem.

4. The server according to claim 3, wherein each subsystem includes a non-transitory computer readable memory encoded with code instructions for encoding the information into a binary structure after processing of said information in the communication level and then in the control level of said subsystem.

5. The server according to claim 3, comprising a non-transitory computer readable memory encoded with code instructions for identifying, as a function of the nature of the request, data which are characteristic of the request and have to be encoded in the binary structure.

6. The server according to claim 3, comprising a non-transitory computer readable memory encoded with code instructions for associating the received request with a request predefined in a limited list of authorised requests.

7. The server according to claim 2, wherein the microkernel comprises a non-transitory computer readable memory encoded with code instructions for associating each application implemented by a subsystem with the control of a server resource.

8. The server according to claim 2, comprising a non-transitory computer readable memory encoded with code instructions for limiting communication in such a way that neither the media level nor the communication level of a subsystem can communicate directly with the media level or the communication level of the other subsystem without the intermediary of the control levels of the subsystems.

9. The server according to claim 2, comprising a non-transitory computer readable memory encoded with code instructions for analysing the syntax and validity of the protocols filtered by each layer used in the server.

10. The server according to claim 2, wherein data to be received by said second subsystem are transferred to said first subsystem only via the control level of said second subsystem.

11. The server according to claim 2, wherein said data to be received by said first subsystem are successively received by the media level, then by the communication level and then by the control level of the first subsystem.

12. A gateway server comprising:
a first subsystem including a media level, a communication level and a control level;
a microkernel;
an IPC controller configured to manage communication between the server resources allocated to the first subsystem;
a second subsystem including a second media level, a second communication level and a second control level such that the microkernel and the IPC controller also manage communication between the server resources allocated to said second subsystem; and
a memory with shared reading and writing, established under the control of the microkernel and the IPC controller,
wherein said first and second subsystems are isolated from each other so that communications between the first and second subsystems are performed only between the control levels of the first and second subsystems via said memory.

13. The server according to claim 12, wherein data to be received by said first subsystem are successively received by the media level, then by the communication level and then by the control level of the first subsystem.

14. A non-transitory computer program product including program code instructions recorded on a memory which can be read by a computer to implement a method for controlling a gateway server when said program runs on a computer, wherein the gateway server comprises a first subsystem including a media level, a communication level and a control level, a microkernel, an IPC controller configured to manage communication between the server resources allocated to the first subsystem, a second subsystem including a second media level, a second communication level and a second control level such that the microkernel and the IPC controller also manage communication between the server resources allocated to said second subsystem, the method comprising transmitting requests between the control level of the first subsystem and the control level of the second subsystem, the requests transmitted using a memory with shared reading and writing, established under the control of the microkernel and the IPC controller, wherein data to be received by said first subsystem are transferred to said second subsystem only via the control level of said first subsystem.

* * * * *